(12) United States Patent
Schoeneman

(10) Patent No.: US 10,062,199 B2
(45) Date of Patent: Aug. 28, 2018

(54) EFFICIENT RENDERING BASED ON RAY INTERSECTIONS WITH VIRTUAL OBJECTS

(71) Applicant: Pixar, Emeryville, CA (US)

(72) Inventor: Christopher R. Schoeneman, Oakland, CA (US)

(73) Assignee: Pixar, Emeryville, CA (US)

( * ) Notice: Subject to any disclaimer, the term of this patent is extended or adjusted under 35 U.S.C. 154(b) by 81 days.

(21) Appl. No.: 15/194,207

(22) Filed: Jun. 27, 2016

(65) Prior Publication Data

US 2017/0372508 A1    Dec. 28, 2017

(51) Int. Cl.
*G06T 15/06*   (2011.01)
*G06T 7/00*    (2017.01)

(52) U.S. Cl.
CPC .............. *G06T 15/06* (2013.01); *G06T 7/004* (2013.01); *G06T 2200/04* (2013.01); *G06T 2207/30244* (2013.01)

(58) Field of Classification Search
CPC ........ G06T 15/06; G06T 15/005; G06T 15/80
See application file for complete search history.

(56) References Cited

U.S. PATENT DOCUMENTS

| 2011/0043521 | A1* | 2/2011 | Smyth | .................... G06T 15/06 345/424 |
| 2011/0137892 | A1* | 6/2011 | Bisson | .................... G06F 17/50 707/722 |

OTHER PUBLICATIONS

Nikodym, "Ray Tracing Algorithm for Interactive Applications", Bachelor's Thesis, Czech Technical University in Prague, Department of Computer Science and Engineering, May 20, 2010, pp. 1-76.

\* cited by examiner

*Primary Examiner* — Diane Wills
(74) *Attorney, Agent, or Firm* — Kilpatrick Townsend & Stockton LLP

(57) ABSTRACT

A method and system for rendering a three-dimensional (3D) scene by excluding non-contributing objects are disclosed. A preliminary object analysis using relatively few rays can be performed to determine which off-camera objects are to be excluded or included in the rendering process. The preliminary object analysis may involve performing an initial ray path tracing to identify intersections between a plurality of rays and one or more objects in the 3D scene. The object analysis can include identifying whether a first object in the 3D scene can be identified as an off-camera object. When the first object is identified as an off-camera object, a number of intersections between the plurality of rays and the first object can be counted. If the number of intersections is less than a corresponding threshold, the first object can be identified as being excluded from a future rendering process to render the first frame.

22 Claims, 9 Drawing Sheets

EFFICIENT RENDERING BASED ON RAY INTERSECTIONS WITH VIRTUAL OBJECTS

BACKGROUND

The present disclosure generally relates to computer animation, and more specifically to rendering.

In computer animation involving a three-dimensional (3D) scene, two-dimensional (2D) images of the 3D scene may be created through a rendering process. The rendering process typically generates the 2D images from a viewpoint of a virtual camera. This process is analogous to taking a photograph of real-world scene using a physical camera. This process may involve mathematically modeling the interaction of light with objects in the 3D scene before rendering the images.

Ray tracing is a technique that is used in the rendering process. In ray tracing, a ray may be cast from the virtual camera, through a pixel of a plane of a 2D image to be rendered, into the 3D scene. An object in the 3D scene can be found as the closest object blocking the path of the ray. This object is then identified as an object that can be seen through the pixel. Using texture information and information regarding the light sources of the 3D scene, the rendering process can determine a shading of this object. Thus, through ray tracing, objects directly "visible" by the virtual camera can be identified as an on-camera object, and objects not directly "seen" by the virtual camera can identified as an off-camera object. Along the ray path back to a light source, a ray may nevertheless "hit" one or more off-camera objects in the 3D scene, even though the one or more off-camera objects do not explicitly appear in the rendered image. Thus, such objects can affect the display of visible objects. However, it can be computationally intensive to account for every object in a 3D scene.

Therefore, it is desirable to provide new systems and methods for efficiently and accurately rendering a 3D scene when ray tracing is used.

BRIEF SUMMARY

Embodiments can provide systems and methods for rendering a three-dimensional (3D) scene by excluding non-contributing objects in the 3D scene from a rendering process. A preliminary object analysis using relatively few rays can be performed to determine which off-camera objects are to be excluded or included in the rendering process. For example, a light ray from a light source may be deflected by a red object that is off-camera and provides a red light on a second object that is on-camera; an off-camera object may cast a shadow onto an on-camera object; or an off-camera object may be specularly reflected by an on-camera object (e.g., a mirror) and seen by the virtual camera.

Such off-camera objects can be identified as "contributing" objects since they impact the appearance of one or more on-camera object. But, if an off-camera object does not interact with rays that show up on-camera, then the off-camera object can be identified as a non-contributing off-camera object. Non-contributing off-camera objects can be excluded in the rendering process, thereby making the rendering process faster. The preliminary object analysis can be used in the rendering pipeline to improve rendering efficiency and reduce resources needed for the rendering. A 3D scene may be rendered multiple times during the development of an animation feature. With objects not contributing to the final image being determined at an initial stage, the speed of subsequent rendering of the 3D scene can improve.

In certain embodiments, the preliminary object analysis may involve receiving computer graphics data defining the 3D scene and performing an initial ray path tracing to identify intersections between a plurality of rays and one or more objects in the 3D scene. The ray path tracing can be performed using a virtual camera and one or more light sources. An object analysis can be performed for a first frame in the 3D scene based on a result of the initial ray path tracing. The object analysis can include identifying whether a first object in the 3D scene can be identified as an off-camera object, i.e., not visible from a virtual camera that renders the first frame. When the first object is identified as an off-camera object, a number of intersections between the plurality of rays and the first object can be counted. If number of intersections is less than a corresponding threshold, the first object can be identified as being excluded from a future rendering process to render the first frame. In some examples, the counted number of intersections can indicate a corresponding number of rays from a light source that are deflected by the first object on to an object that is visible from the virtual camera.

In some examples, upon identifying the first object as an off-camera object, it can be further determined whether the first object is an opaque object. If the first object is determined to be an opaque object, a number of intersections can be counted as "opaque" rays as these rays can indicate a shadow of the first object is cast to an object that is visible from the virtual camera. If the counted number of the opacity rays exceed a threshold, the first object can be identified as a contributing off-camera object.

In some examples, the counted number of intersections can indicate a corresponding number of rays that are deflected by the first object onto a specular surface of an on-camera object and the specular surface is visible to the viewpoint of the virtual camera. Such ray paths may be referred to as "reflection" rays. If the counted number of the reflection rays exceeds a threshold, the first object can be identified as a contributing off-camera object.

In some examples, the counted number of ray intersections for the first object can be compared with a threshold representing a minimum degree of contribution for inclusion. The comparison can include determining a ratio between the counted number and the total number of the plurality of rays cast by the initial ray path tracing; and comparing this ratio to the value of the threshold. If this ratio exceeds the threshold value, the first object can be identified as a contributing off-camera object and can be included in the rendering process by associating an inclusion flag with the first object. If the ratio is less than the threshold value, the first object can be identified as a non-contributing off-camera object and can be excluded in the rendering process by associating an exclusion flag with the first object.

In some examples, if the first object is off-camera, and no ray intersections are counted for the first object, the first object can be identified as a non-contributing off-camera object. In those cases, the first object can be associated with an exclusion flag such that it can be excluded in the future rendering process This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments are directed to performing a preliminary object analysis through ray tracing to determine which off-camera objects in a three-dimensional (3D) scene can be excluded in the rendering process. Certain off-camera objects, even though not appearing in an rendered image, can impact appearance of one or more on-camera objects in the rendered image. Such off-camera objects may be referred to as contributing objects and can be included in the rendering process. On the other hand, certain off-camera objects in the 3D scene do not provide any lighting to any on-camera objects in the rendered image. Such off-camera objects may be referred to as non-contributing off-camera objects and can be excluded in the rendering process.

I. Introduction

As mentioned above, a virtual camera (render camera) can be used to render a 3D scene into a series of 2D images for creating animation. Objects that can be directly "seen" by the virtual camera—i.e., on-camera objects, should be included in the rendering process (e.g., to be fully rendered). Certain objects, although are not seen by the virtual camera, can nevertheless contribute to the appearance of one or more on-camera objects in the rendered image and thus can also be included in the rendering process (e.g., fully or partially rendered) for accurate rendering. For example, some off-camera objects can provide lighting to one or more on-camera objects by deflecting (e.g., scattering) light rays from a light source onto the one or more on-camera objects. As another example, some off-camera objects can be specularly reflected by an on-camera object (e.g., a mirror) and thus can be seen by the virtual camera. Still as another example, some off-camera objects (e.g., opaque objects) can cast shadows to one or more on-camera objects and the shadows can be seen by the virtual camera. On the other hand, certain off-camera objects may not provide any lighting to the on-camera objects and thus do not contribute to the appearance of any on-camera object in the rendered image.

Figure 1:
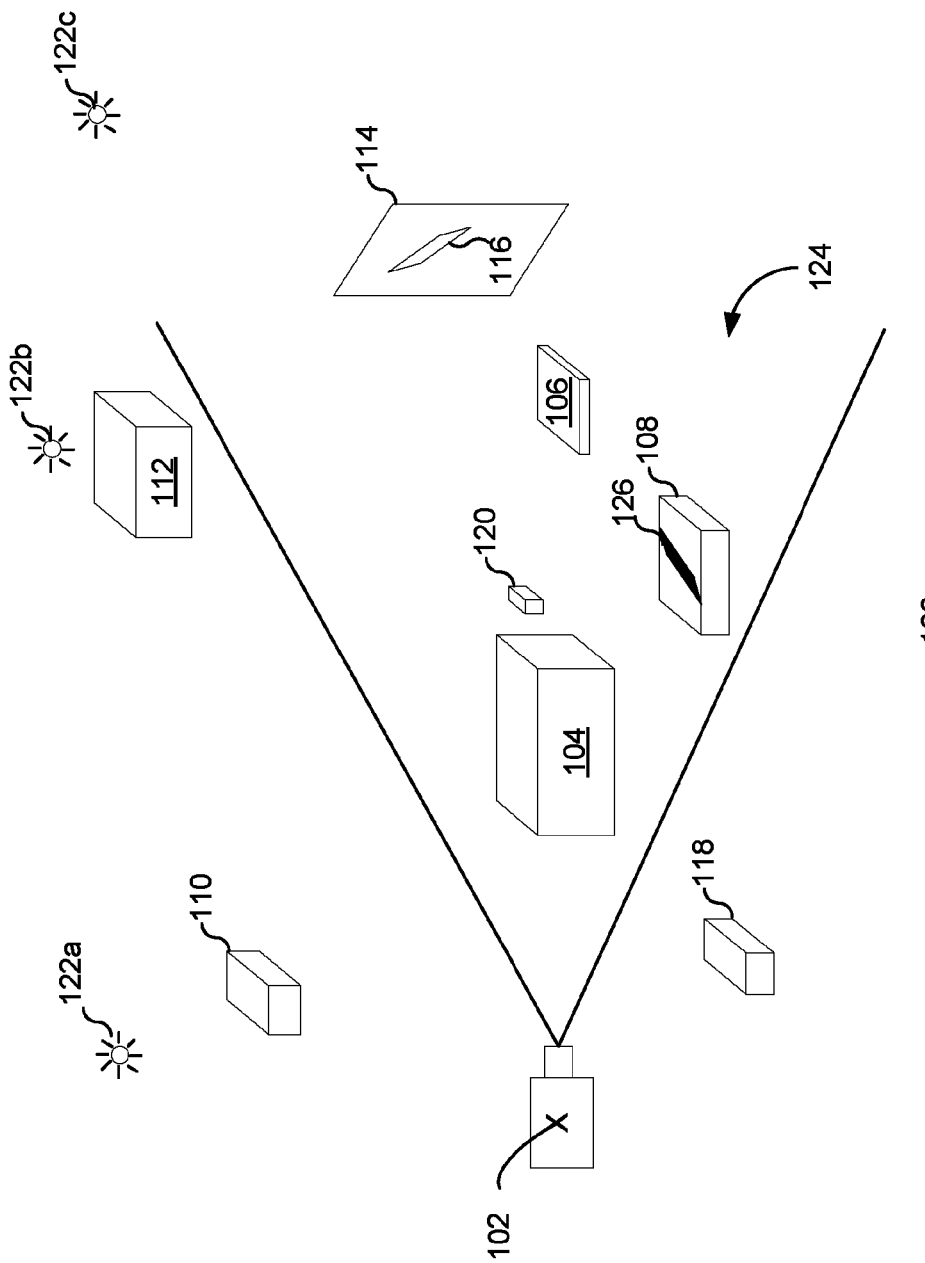
FIG. 1 is a diagram showing a three-dimensional scene with on-camera objects, contributing off-camera objects, and non-contributing off-camera objects.

FIG. 1 is a diagram showing a three-dimensional scene 100 with on-camera objects, contributing off-camera objects, and non-contributing off-camera objects. As shown, a render camera 102 can be placed at a specific location within the 3D scene 100 for rendering the 3D scene 100. As also shown, the 3D scene 100 can comprise one or more light sources, such as light sources 122a-c shown in this example. The light sources 122a-c can provide lighting to illuminate the objects in the 3D scene 100 much like light sources in the real world for lighting objects for photographing. Just as in the real world, the lighting provided by the light sources 122a-c can be deflected or refracted off any object in the 3D scene 100 and can "show up" on the virtual camera 102. For example, the light sources 122a-c can cast a shadow of an object in the 3D scene 100 onto another object in the 3D scene 100. The light sources 122a-c can cause a specular reflection of an object in the 3D scene 100 through another object in the 3D scene 100 (e.g., a virtual mirror in the 3D scene). Light rays from light sources 122a-c can be deflected (e.g., scattered) by an object onto another object in the 3D scene.

As shown, the render camera 102 can have a view frustum 124 that defines a region of space in the 3D scene that can appear on an image captured by the render camera—i.e., a rendered image of the 3D scene. In this example, as illustration, objects 104, 106, 108, 114 and 120 are within the view frustum 124, and objects 110, 112, and 118 are outside the view frustum 124. It should be understood, even though objects 104, 106, 108, 114 and 120 are within the view frustum 124, these objects do not necessarily appear in the rendered image. As illustrated in this example, objects 106 and 120, although are in the view frustum 124, are blocked by object 104, which is an opaque object in this example, from being viewed by the render camera 102. For purposes of this disclosure, objects 106 and 120 are considered as off-camera objects because they cannot be seen by the rendered camera 102. Accordingly, in this example, objects 104, 108 and 114 are on-camera objects, and the rest of the objects in the 3D 100 as shown are off-camera objects.

A. Contributing Off-Camera Objects

As mentioned above, certain off-camera objects, even though will not appear in the render image, can impact the appearance of one or more on-camera objects in the rendered image. Such off-camera objects can be considered as contributing off-camera objects. In this example, object 112 can be an contributing off-camera object because light source 122b casts a shadow 126 onto a visible surface of the on-camera object 108. Although the off-camera object 112 cannot appear in the rendered image, the shadow 126 of the off-camera object 112 can appear in the rendered image. Thus, the off-camera object 112 can be considered as contributing to the rendered image.

As another example, the off-camera object 110 can be an contributing off-camera object because object 110 is reflected through a visible specular surface of the on-camera object 114 and thus can be seen by render camera 102. Examples of an object with specular surface, may include an mirror, a waterbody (e.g., lake, river, stream, ocean), an object with polished surface (e.g., a vase), and/or any other object that has a specular surface. Thus, the off-camera object 110 can be considered as contributing to the rendered image.

Still as another example, the off-camera object 116 can be a contributing off-camera object because the light rays from light sources 122a-c are scattered by the off-camera object 106 onto the on-camera object 108. As illustration, the off-camera object 106 can be a red object with a rough surface that scatters red light rays onto the visible surface of the on-camera object 108. The scattering of the red light by the off-camera object 106 provides red light rays to the on-camera object 108, which can impact the appearance of the on-camera object 108 (e.g., color) in the rendered image. Thus, the off-camera object 116 can be considered as contributing to the rendered image.

Other examples of contributing off-camera objects, although not illustrated in FIG. 1, are contemplated. For example, an off-camera object can be a translucent object such that the light rays from a light source can be refracted through the translucent object onto one or more on-camera objects. As another example, an off-camera micro object may not by itself provide enough light rays to an on-camera object to impact the appearance of the on-camera object in the rendered image, but multiple of such a micro object can provide sufficient light rays to the on-camera object to impact the appearance of the on-camera object in the rendered image, and thus it can be considered as a contributing off-camera object. As illustration, without limitation, a tiny tree leave on a tree far away from the on-camera object might not provide enough light rays to the on-camera object, but aggregation of such a tree leave (e.g., a patch of tree leaves protruding from the tree into on-camera object) can provide enough light rays (scattered light rays) to the on-camera object or can cast a shadow to the on-camera object. In that example, the tiny tree leave in the patch can be considered as a contributing off-camera object.

B. Non-Contributing Off-Camera Objects

As mentioned above, certain off-camera objects may not provide any light rays or cast a shadow to any on-camera object in the 3D scene and those off-camera objects can be considered as non-contributing off-camera objects. For example, off-camera object 118 shown in FIG. 1 is a non-contributing off-camera object because it is outside frustum 124 and it does not provide any light rays to any on-camera objects shown (in this example, there is any light source around off-camera object 118). As another example, off-camera object 120 is a non-contributing off-camera object because it is blocked by the opaque object 104 from the view of render camera 102 as shown and does not deflect any light rays onto any on-camera object. Accordingly, the non-contributing off-camera objects 120 and 118 do not appear in the rendered image and do not impact the appearance of any on-camera object in the rendered image. As such, off-camera objects 120 and 118 can be considered as non-contributing objects.

II. Impact of Off-Camera Object to Rendered Image

Embodiments of the present invention can determine whether an off-camera object is a contributing off-camera object by performing a preliminary object analysis. The object analysis can be performed prior to rendering the 3D scene, and can include performing an initial ray path tracing. Through the initial ray path tracing, one or more rays (samples) can intersect one or more off-camera objects on their way back to one or more light sources that provide light rays to the 3D scene. In certain embodiments, different types of ray intersections with a given off-camera objects can be counted, such as 1) reflection rays (the given off-camera object is reflected by an on-camera object, 2) opaque rays (the given off-camera object casts a shadow of onto an on-camera object, 3) refraction rays (the off-camera object refracts light ray onto an on-camera object), 4) scatter rays (rays that are scattered by the given off-camera object on to an on-camera object), and/or any other types of ray intersections.

A. Different Kinds of Lighting Impacts by Off-Camera Objects

Figure 2:
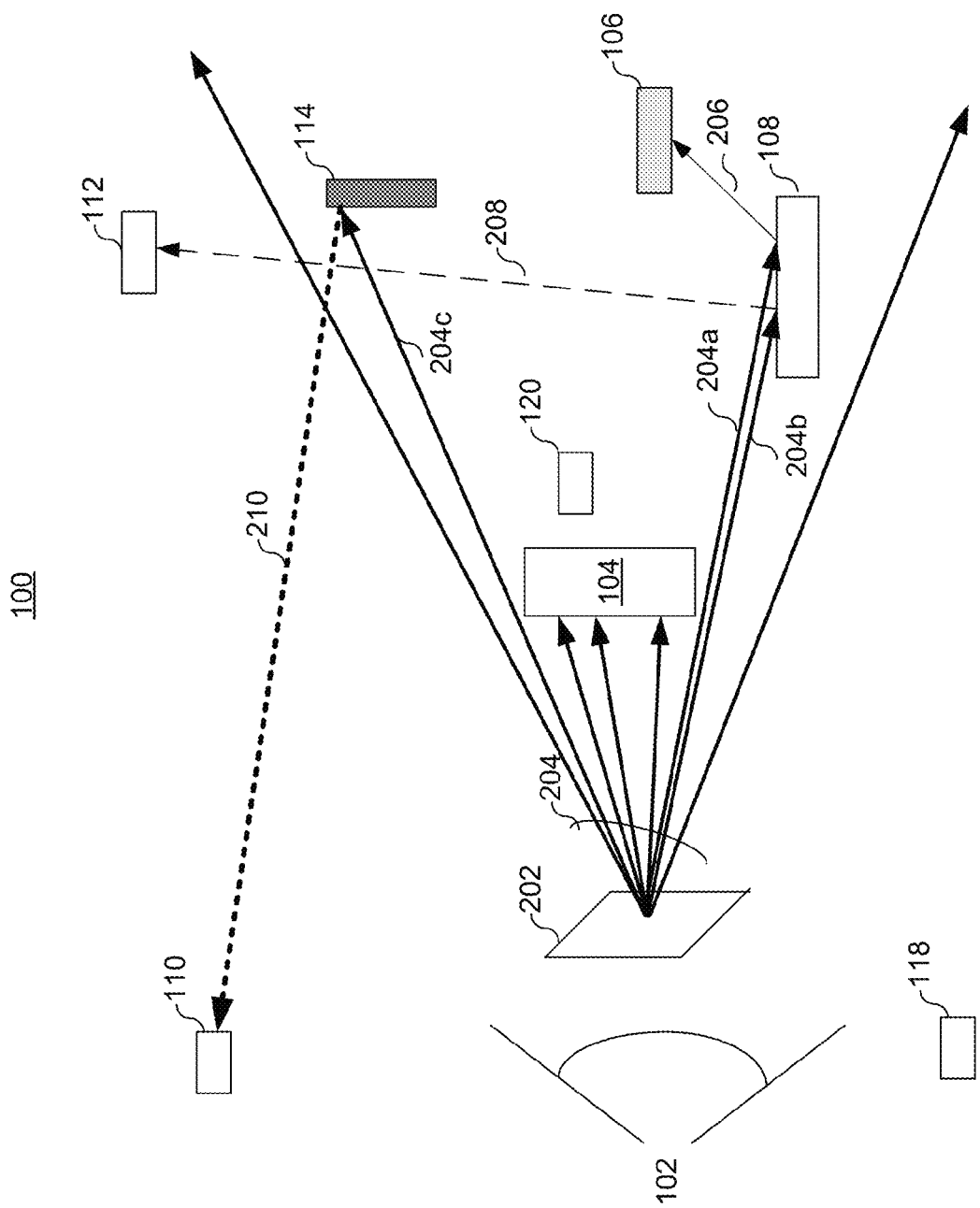
FIG. 2 is a diagram illustrating various kinds of impacts by off-camera objects to on-camera objects.

FIG. 2 is a diagram illustrating various kinds of ray intersections with off-camera objects. It will be described with reference to FIG. 1. The 3D scene 100 shown in FIG. 1 is illustrated from a side view in FIG. 2. As shown, the initial ray path tracing may be performed by casting a plurality of rays 204 from a viewpoint 202 (with respect to render camera 102) into the 3D scene 100. For example, without limitation, the viewpoint 202 may include a pixel on an image plane of an image of the 3D scene 100 to be rendered. The number of the plurality of rays 204 that can be cast by the initial ray path tracing can be however desired. Typically, a larger number of rays 204 can be used if many objects are in the 3D scene 100, and a smaller number of rays 204 can be used if few objects are in the 3D scene 100. In some examples, the initial ray path tracing can be performed once. As mentioned above, the 3D scene 100 may be rendered multiple times during development of an animation. After the initial ray path tracing and the object analysis as described below are performed, certain non-contributing off-camera objects can be excluded in the subsequent rendering of the 3D scene 100. In some examples, the initial ray path tracing can be performed multiple times in the object analysis. For example, in one embodiment, after certain off-camera objects are excluded in a first pass, the ray tracing is performed again for a second, third, fourth and/or any other passes.

As illustrated, some of the plurality of rays 204 cast into the 3D scene 100 can directly intersect with one or more objects in the 3D scene 100, such as objects 104, 108 and 114. As discussed above, these objects are on the direct ray path from the view point 202 of the render camera 102. As such, these objects can be considered as on-camera objects that will appear in the rendered image. On-camera objects should be included in the rendering process. As also illustrated, some of the plurality or rays 204 do not intersect with any of the objects in the 3D scene 100.

As shown in this example, on-camera object 108 receives two rays 204, ray 204a and ray 204b on a visible surface of the on-camera object, the surface being visible to the viewpoint 202. As shown, ray 204a bounces off on-camera object 108 onto off-camera object 106 on its way back to a light source in the 3D scene 100. This is indicated by the ray path 206 as shown. As discussed above, off-camera object 106 cannot be directly seen from the viewpoint 202 because it is blocked by the on-camera object 104, which is opaque in this example. As also mentioned above, off-camera object 106 is a red object that deflects red light from a light source in the 3D scene 100, such as the light sources 122a-c shown in FIG. 1 and absorbs all other colors. In this example, ray 204a traces its way to the off-camera object 106 because off-camera object 106 provides light rays to the visible surface of the on-camera object 108. The intersection by ray 206 with the off-camera object 106 indicates the off-camera object 106, which is red, deflects (scatters) red light rays from the light sources 122a-c on to the on-camera object 108.

As also shown, ray 204b bounces off on-camera object 108 onto off-camera object 112. This is indicated by ray path 208. However, ray path 208 is traced by the ray path tracing due to an effect different from that for ray path 206 described above. As discussed above, ray path 208 is traced because of the opacity of off-camera object 120. That is, because off-camera object 120 blocks light rays from light sources, such as the light source 122b shown in FIG. 1. As a result, a shadow of off-camera object 120, such as shadow 126 shown in FIG. 1, is cast onto the visible surface of the on-camera object 108.

As still shown, ray 204c bounces off on-camera object 114 onto off-camera object 110. This is illustrated by ray path 210. As discussed above, ray path 210 is traced by the ray path tracing reflection by a visible specular surface of the on-camera object 114. The specular surface of the on-camera object 114 can reflect light rays from an incoming direction to an outgoing direction onto the viewpoint 202. As a result, light rays deflected or refracted by off-camera object 110 can be reflected onto the viewpoint 202 through the visible specular surface of the on-camera object 114.

As also shown, no rays intersect with off-camera object 120 and off-camera object 118. As discussed above, the off-camera object 120 is blocked by on-camera object 104, which is opaque. Unlike off-camera object 106, off-camera object 120 does not provide any light rays to any on-camera object in the 3D scene 100. The off-camera object 118 is outside frustum of the render camera 102 as shown in FIG. 1 and thus cannot be seen by viewpoint 202. Unlike off-camera objects 106, 110, and 120, off-camera object 118 does not provide any light to any on on-camera object in the 3D scene 100 because there is no light source around off-camera object 118.

B. Determining Whether an Off-Camera Object is Contributing

After the initial ray path tracing is performed, an object analysis may be performed for each of a plurality of objects in the 3D scene 100. The scope and/or the number of the plurality objects to which the object analysis is performed can be however desired. Typically, a wider area and/or a larger number of the objects can be selected for the object analysis if many light sources are placed around the 3D scene 100, and a narrower area and/or a smaller number of the objects can be selected if few light sources are placed around the 3D scene 100. The object analysis for a given object selected can include counting a number of intersection of rays deflected by the given object as illustrated in FIG. 2. This is illustrated in FIG. 3.

Figure 3:
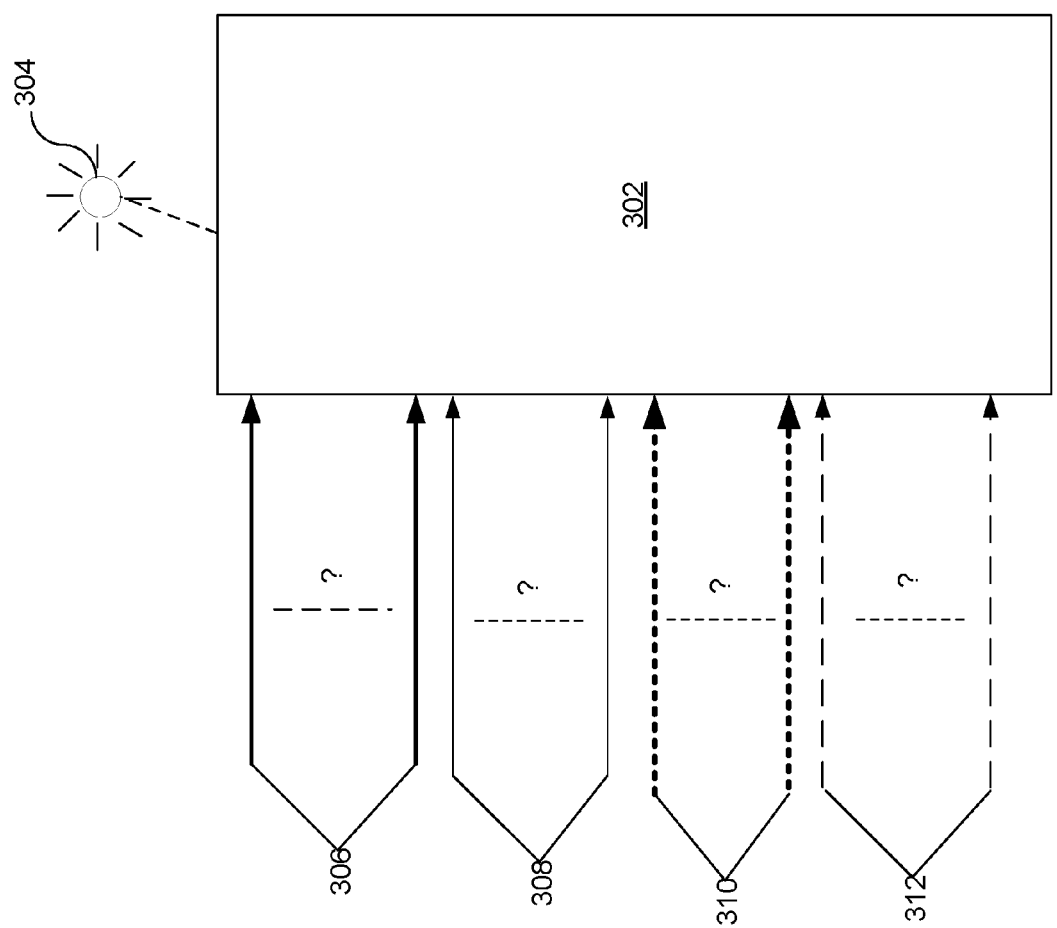
FIG. 3 illustrates different kinds of rays provided by an object in a three-dimensional scene can be counted.

FIG. 3 illustrates different types of rays can be counted for an object 302. As shown, a plurality of rays, such as rays 306, 308, 310 and 312 cast by initial ray path tracing illustrated in FIG. 2 can be traced back to the object 302. The intersection of these rays with the object 302 can indicate the object 302 impacts the appearance of one or more on-camera objects in the rendered image.

For determining whether the object 302 is contributing the rendered image of the 3D scene, a number of each above-described kind of rays can be counted by counting corresponding kinds of intersections between the rays cast by the initial ray path tracing and object 302. As shown, intersections between rays 306 and object 302 can indicate a corresponding number of rays from a light source 304 are directly deflected by object 302 and show up on the virtual camera. For purposes of this application, 306 may be referred to as "direct ray paths" herein. The number of direct ray paths can be counted for determining whether the object 302 is on-camera. In some examples, a corresponding threshold may be set for the direct path rays such that if an object receives more than the threshold number of the direct ray paths, the object can be included in the rendering process. The threshold value for the direct ray paths can be relatively low.

As also shown, intersections between rays 308 and object 302 can indicate a corresponding number of rays from the light source 304 are scattered by object 302 onto a visible surface of one or more on-camera objects. For purposes of this application, rays 308 may be referred to as "scatter" rays herein. In certain embodiments, the number of scatter rays received by an off-camera object can be counted in the object analysis. In some examples, a corresponding threshold may be set for the scatter rays such that if an off-camera object provides more than the threshold number of the scatter rays, the object can be included in the rendering process. The threshold value for the scatter rays can be relatively high.

As still shown, intersections between rays 310 and object 302 can indicate a corresponding number of rays from light source 304 are deflected by object 302 onto a visible specular surface of an on-camera object. As a result, a specular image of the object 302 can be seen from the render camera. For purposes of this application, rays 310 may be referred to as "reflection rays" herein. In certain embodiments, the number of reflection rays can be counted in object analysis. In some examples, a corresponding threshold may be set for the reflection rays such that if an off-camera object provides more than the threshold number of the reflection rays, the object can be included in the rendering process. The threshold value for the reflection rays can be relatively low.

As yet shown, intersection between rays 312 and object 302 can indicate light source 304 casts a shadow of object 312 onto a visible surface of one or more on-camera object. For purposes of this application, rays 312 may be referred to as "opaque rays" herein. In certain embodiments, the number of such rays can be counted in the analysis. In some examples, a corresponding threshold may be set for the opaque rays such that if an off-camera object provides more than the threshold number of the opaque rays, the object can be included in the rendering process. The threshold value for the opaque rays can be relatively low.

In certain embodiments, the determination whether the object 302 contributes to rendered image can be based on the number of rays 306, 308, 310, 312 and/or any other rays counted in the analysis. For example, if the counted number of rays 306 is larger than a threshold (typically such a threshold is low), object 302 can be determined as an on-camera object, and vice versa. When the object 302 is identified as an off-camera object, the counted number of rays 308, 310 and 312 can each be compared with a corresponding threshold as described above. In some examples, object 302 can be determined as a contributing off-camera object if any number of rays 308, 310 or 312 exceeds the corresponding threshold.

III. Object Culling Based on Contribution to Rendered Image

During development of an animation, a 3D scene may be rendered multiple times. For improving rendering efficiency, non-contributing off-camera objects can be excluded in the rendering process. On the other hand, it is desirable to include the contributing off-camera objects in the rendering process for accuracy and realism. In certain embodiments, after the object analysis is performed for each of the plurality of objects selected in the 3D scene as described above, an exclusion flag can be associated with each of the non-contributing off-camera objects identified so that they may not be rendered in the rendering process; and an inclusion flag can be associated with each of the contributing off-camera objects identified so that they can be rendered in the rendering process. For example, a number of rays traced back to an off-camera object due to deflection can be counted and compared with a predetermined deflection threshold. If the number exceeds the predetermined deflection threshold, the off-camera object can be associated with an inclusion flag.

A. Object Exclusion by Performing an Object Analysis

Figure 4:
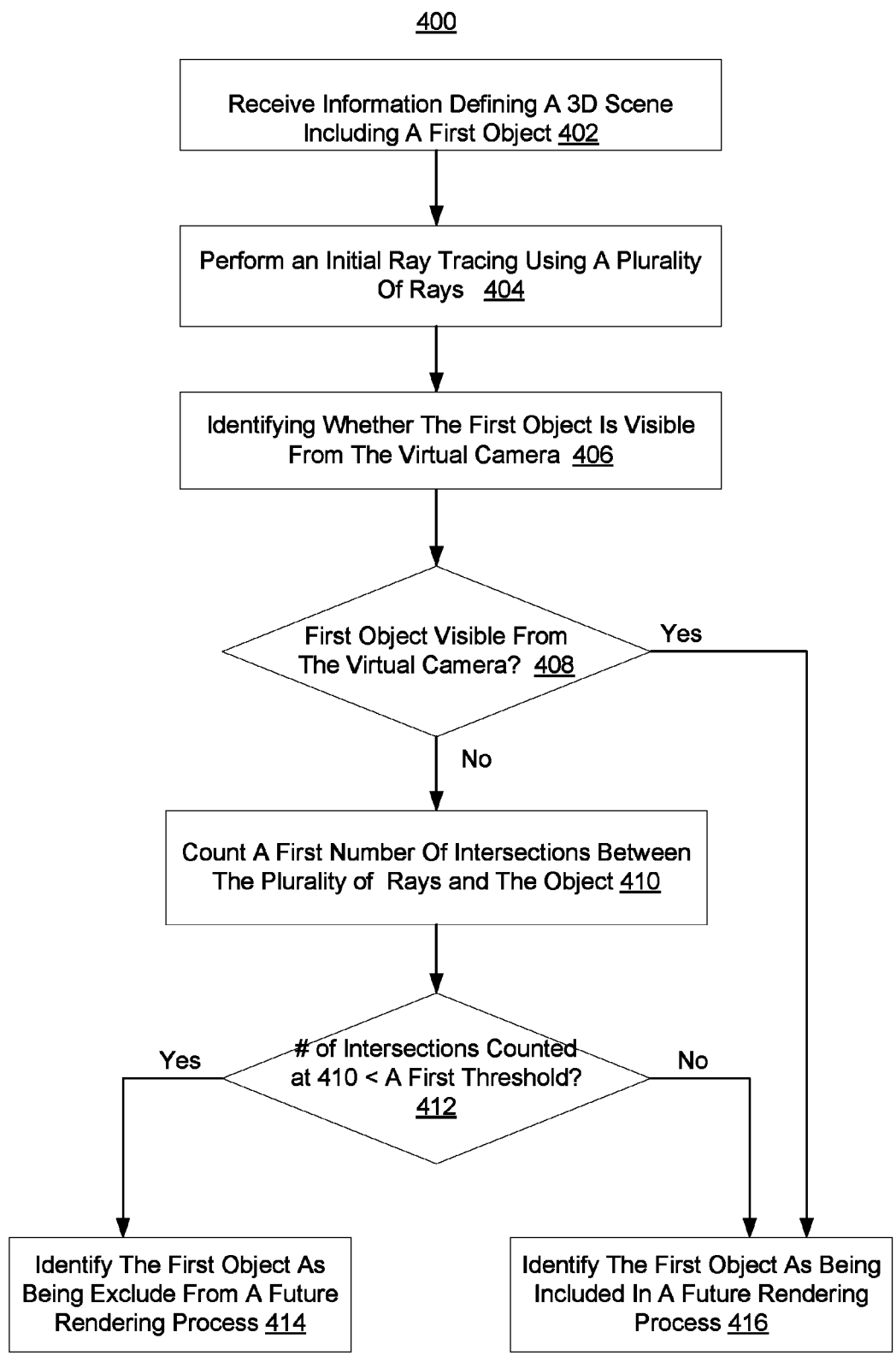
FIG. 4 is flowchart of a method for performing an analysis to determine whether an object in a three-dimensional scene is to be included or excluded in the rendering process by counting a number of rays from a light source that is deflected by the object.

FIG. 4 is flowchart of an exemplary method 400 for performing an object analysis to determine whether an object in a three-dimensional scene can be included or excluded in the rendering process by counting a number of rays from a light source that is deflected by the object. Method 400 may be used in rendering images of a segment of an animated scene such that one or more off-camera objects can be excluded in the rendering process. Method 400 may be performed wholly or partially by a computer system.

At block 402, information defining a 3D scene can be received. The 3D scene may comprise one or more objects including a first object. The information received at 402 may include render camera information regarding a render camera placed at a specific location within the 3D scene for rendering the 3D scene. The render camera information can indicate specifics about a view frustum of the render camera that defines a region of space (such as field of view from the camera measured by rotational degrees, and/or a focal length of the camera) in the 3D scene that can appear on a rendered image. The information received at 402 the 3D scene may include light source information indicating one or more light sources, such as light sources 122a-c shown FIG. 1. The information received at 402 may include object information regarding the one or more objects in the 3D scene. The object information regarding a given one of the one or more 3D objects may indicate a location of the given object in the 3D scene; a material property of the given object, a size or volume of the given object, an orientation of the given object, and/or any other object information. The information regarding a location of the given object in the 3D scene can indicate whether the given object is inside or outside of the frustum of the render camera as indicated by the render camera information. The information regarding a martial property of the given object can indicate whether the object is transparent, translucent or opaque, and/or whether the object has one or more specular surfaces and/or one or more rough surfaces. The information regarding a martial property of the given object can indicate one or more colors of the given object. The information regarding a size, volume, or an orientation of the given object can indicate one or more surfaces of the given object are visible from the render camera. Other information that can be included in the information received are contemplated.

At block 404, an initial ray path tracing may be performed based on the information received at block 402. The initial ray path tracing can cast a plurality of rays into the 3D scene represented by the information received at block 404. The plurality of rays can be cast into the 3D scene from pixels of an image plane, such as image plane as shown. For example, the plurality of rays can be cast from each pixel or a subset of pixels on the image plane 202. It should be understood the number of the plurality of rays that can be cast by the initial ray path tracing can be however desired. Typically, a larger number of the rays can be cast if many objects are in the 3D scene, and a smaller number of rays can be cast if few objects are in the 3D scene. The rays cast by the initial ray path tracing can hit one or more objects in the 3D scene either directly or indirectly on their way back to the one or more light sources as illustrated in FIG. 2. In one embodiment, the initial ray path tracing is performed by using Pixar Renderman®. In that embodiment, the number of rays cast by the initial ray path tracing can be configured by a user.

In some examples, the number of rays cast by the initial ray path tracing are automatically adjusted after certain off-camera objects are excluded in a first pass of the object analysis. For example, after the first pass of the object analysis, the 3D scene can be rendered without the excluded off-camera objects. A result of the rendering can be examined manually by a user or automatically by a computer device implementing method 400. Based on the result of examination, the quantity of rays cast can be adjusted to a new number, and another pass of ray tracing and object analysis can be performed. This cycle of adjustment of the number of rays cast can be repeated multiple times until a desired number of rays to be cast in the initial ray path tracing is found.

At block 406, a determination whether the first object is visible from the virtual camera can be performed. In some examples, the determination performed at block 406 can involve counting a number of direct path intersections by the rays cast at block 404 with the given object in the 3D scene. As discussed above, such rays can be considered direct ray paths. An example of direct ray paths 306 is described and illustrate in FIG. 3. In one embodiment, the number of the direct ray paths received by the given object is automatically counted by Renderman and recorded in association with the given object.

At block 408, a decision whether the first object can be determined whether as being visible from the virtual camera or not being visible from the virtual camera. For example, the decision at block 408 can involve comparing the countered number of direct path rays with a corresponding threshold, e.g., a direct ray path threshold. In certain embodiments, the direct ray path threshold may include an absolute number from 0 to infinity. As discussed above, typically the direct path ray threshold is relatively low.

As shown, in the case where the result of the decision 408 indicates the first object is visible from the virtual camera, method 400 proceeds to block 416. In that case, the first object can be identified as an on-camera object that will appear in the rendered image. On the other hand, in the case where the result of the decision 408 the first object is not visible from the virtual camera, method 400 proceeds to block 410.

At block 410, a first number of intersections between the plurality of rays cast by the initial ray path tracing can be counted. The intersections counted at block 410 can include those caused by deflection rays (e.g., reflection rays and/or scatter rays), opaque rays, refraction rays, and/or any other type(s) of rays as described and illustrated herein (for example, FIG. 3).

At block 412, the number of non-direct path ray interaction with the object counted at block 412 can be compared with a first threshold. In certain embodiments, the first threshold may include an absolute number from 0 to infinity. In some examples, the first threshold is set by a user as however desired. As shown, in the case where the result of the comparison at block 412 indicates the counted number of non-direct path ray interactions, for example those caused by deflection rays, is not less than the first threshold, method 400 proceeds to block 416. In that case, as discussed above, the first object can be identified as a contributing off-camera object that can impact the appearance of one or more on-camera objects in the rendered image. On the other hand, in the case where the result of the comparison at block 412 indicates the counted number of non-direct path ray counted at block 412 is less than the second threshold, method 400 proceeds to block 414.

At block 414, the first object can be identified as being a non-contributing off-camera object and as being excluded from a future rendering process. As illustration, the identification performed at block 414 can result in first object not being placed on a list of one or more objects for rendering one or more frames of the 3D scene. As discussed above, non-contributing off-camera object cannot be directly seen by the rendered camera and does not impact appearance of any on-camera object in the rendered image. As such, non-contributing off-camera object can be excluded in the rendering process. In some examples, identification at block 414 can involve associating an exclusion flag with the first object. In one example, the exclusion flag is used by the rendering process and based on the exclusion flag associated with the given object, the rendering process skips the rendering of the given object.

At block 416, the first object can be identified as being a contributing object (on or off-camera) and as being included in a future rendering process. In some examples, block 416 can involve associating an inclusion flag with the first object. An on-camera object can be directly seen by the rendered camera. Thus, it is desirable to render an on-camera object in the rendering process. A contributing off-camera object, although not appearing in the rendered image, can impact the appearance of one or more on-camera objects on the rendered image. As such, contributing off-camera object can be included in the rendering process. In one example, the inclusion flag is used by the rendering process and based on the inclusion flag associated with the given object, the rendering process further processes the given object for rendering the 3D scene.

Figure 5:
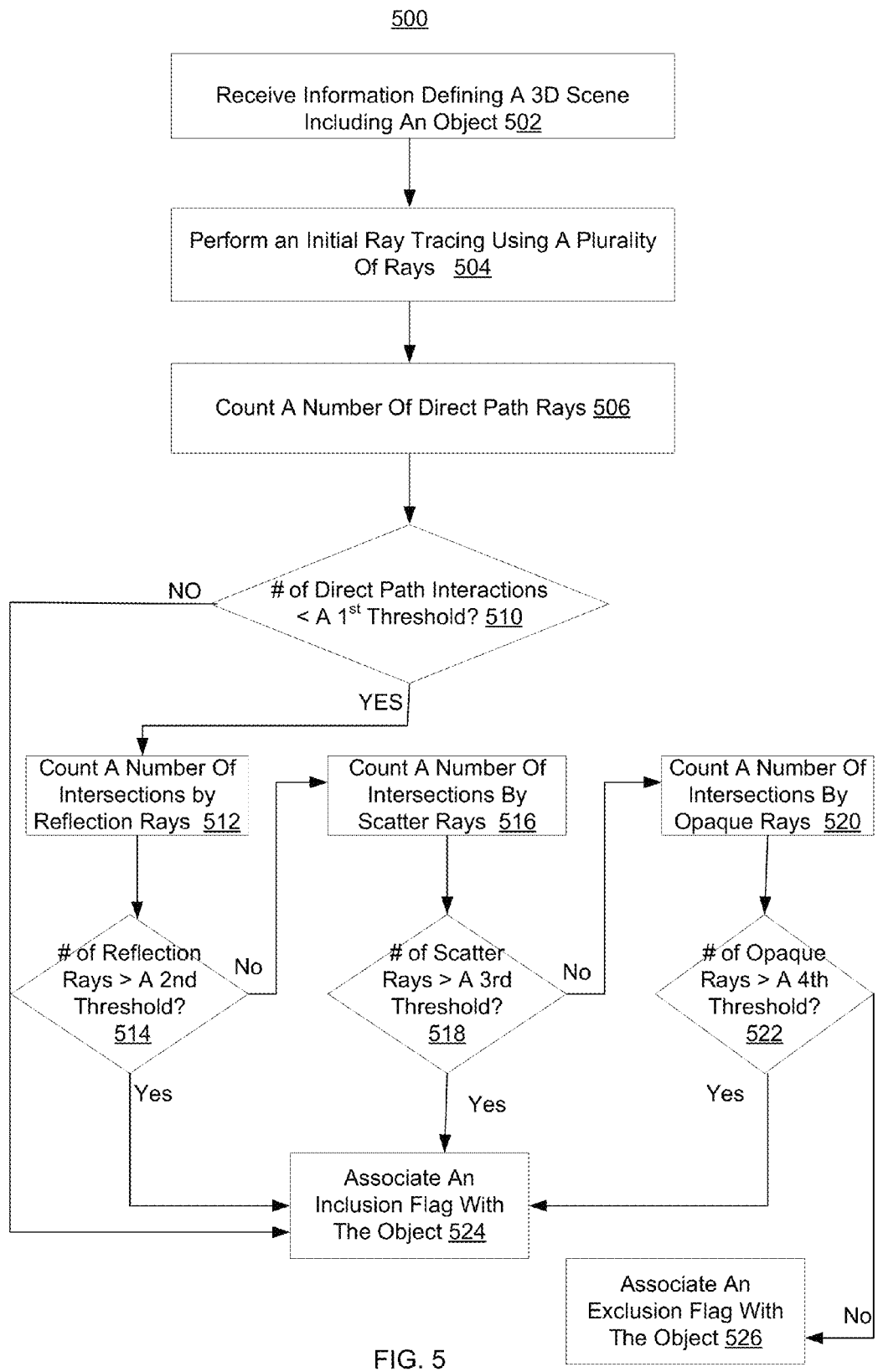
FIG. 5 is flowchart of another method for performing an analysis to determine whether an object in a three-dimensional scene is to be included or excluded in the rendering process.

FIG. 5 is flowchart of another exemplary method 500 for performing an analysis to determine whether an object in a three-dimensional scene is to be included or excluded in a rendering process. Method 500 may be used in rendering images of a segment of an animated scene. Method 500 may be performed wholly or partially by a computer system. Blocks, 502, 504, 506, 508 and 510 are the same as the respective one of blocks 402, 404, 406, 408, and 410 shown in FIG. 4, For simplicity, please refer to FIG. 4 for those blocks.

At block 512, a number of rays that are deflected by the given object on to a specular surface of an on-camera object can be counted. As discussed above, these may be referred to as reflection rays such as rays 310 described and illustrated herein. In one embodiment, block 512 can be performed by Renderman and recorded in association with the given object.

At decision block 514, the number of reflection rays counted at block 512 can be compared with a second threshold, for example a reflection threshold. In certain embodiments, the second threshold may include an absolute number from 0 to infinity. In some examples, the second threshold is set by a user as however desired. As shown, in the case where the result of the comparison at block 514 indicates the counted number of reflection rays exceeds the second threshold, method 500 proceeds to block 524. In that case, as discussed above, the given object can be identified as a contributing off-camera object. On the other hand, in the case where the result of the comparison at block 514 indicates the counted number of reflection rays is less than the second threshold, method 500 proceeds to block 516 for further processing.

At block 516, a number of rays that are scattered by the given object on to a specular surface of an on-camera object can be counted. As discussed above, these may be referred to as reflection rays such as rays 308 described and illustrated herein. In one embodiment, block 516 can be performed by Renderman and recorded in association with the given object.

At decision block 518, the number of reflection rays counted at block 516 can be compared with a third threshold, for example a scatter threshold. In certain embodiments, the third threshold may include an absolute number from 0 to infinity. In some examples, the third threshold is set by a user as however desired. As shown, in the case where the result of the comparison at block 518 indicates the counted number of scatter rays exceeds the third threshold, method 500 proceeds to block 524. In that case, as discussed above, the given object can be identified as a contributing off-camera object. On the other hand, in the case where the result of the comparison at block 518 indicates the counted number of scatter rays is less than the third threshold, method 500 proceeds to block 520 for further processing.

At block 520, a number of rays that indicate a light source casts a shadow of the given object on to an on-camera object can be counted. As discussed above, these may be referred to as opaque rays such as rays 312 described and illustrated herein. In one embodiment, block 520 can be performed by Renderman and recorded in association with the given object.

At decision block 522, the number of opaque rays counted at block 516 can be compared with a fourth threshold, for example a opaque threshold. In certain embodiments, the fourth threshold may include an absolute number from 0 to infinity. In some examples, the fourth threshold is set by a user as however desired. As shown, in the case where the result of the comparison at block 520 indicates the counted number of opaque rays exceeds the fourth threshold, method 500 proceeds to block 524. In that case, as discussed above, the given object can be identified as a contributing off-camera object. On the other hand, in the case where the result of the comparison at block 520 indicates the counted number of opaque rays is less than the fourth threshold, method 500 proceeds to block 524 for further processing.

At block 526, an exclusion flag is associated with the given object, which has been determined as a non-contributing off-camera object.

B. Object List Based Frame Rendering

Figure 6:
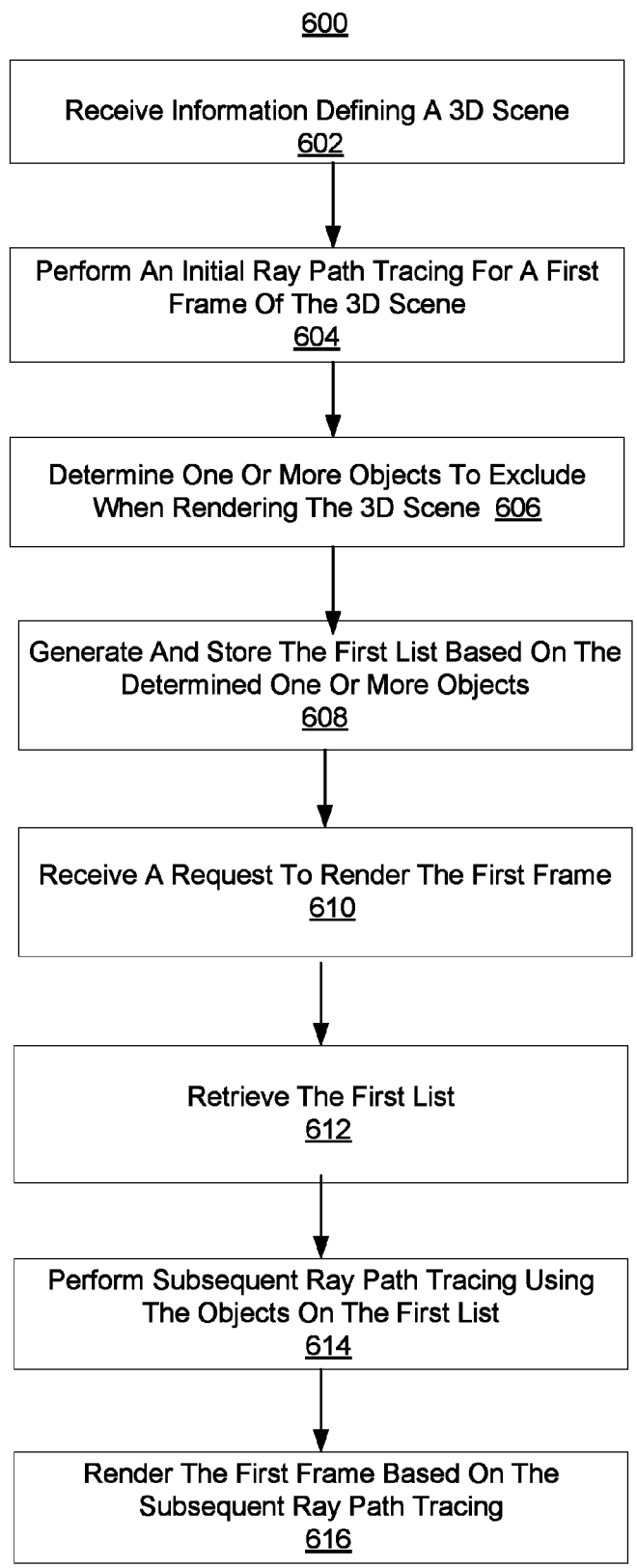
FIG. 6 is flowchart of an exemplary method for rendering a first frame of a 3D scene in accordance with one embodiment.

FIG. 6 is flowchart of an exemplary method 600 for rendering a first frame of a 3D scene in accordance with one embodiment. Method 600 may be used in rendering images of a segment of an animated scene such that one or more off-camera objects can be excluded in the rendering process. Method 600 may be performed wholly or partially by a computer system.

At block 602, information defining a 3D scene can be received. The 3D scene may comprise one or more objects. The information received at block 602 may be for rendering the 3D scene in multiple frames, e.g., an animation of the 3D scene. The information received at block 602 can include camera information for rendering a first frame, camera information rendering a second frame, and any other camera information. The camera information for rendering the first frame may include a location in the 3D scene where the camera is placed, an orientation of the camera, a field of view of the camera, a lens used by the camera, and/or any other camera information for rendering the first frame. The camera information for rendering the second frame can include substantially similar camera information to that described above for rendering the first frame.

At block 604, an initial ray path tracing can be performed for rendering a first frame of the 3D scene. The initial ray tracing at block 604 can be performed from an image plane corresponding to a camera location for the first frame. In some examples, block 604 is the same as or substantially similar to block 404 described above.

At block 606, it can determined, based on the initial ray path tracing at block 604, to exclude one or more objects in the 3D scene when rendering the first frame. In some examples, block 606 can involve performing blocks 406, 408, 410, 412, 414 for each object in the 3D scene for rendering the first frame.

At block 608, a first list of one or more objects to be included in a rendering process for rendering the first frame can be generated and stored. In some examples, the list generation at block 608 can be based on the one or more objects determined as being excluded from a rendering process. For example, the list generation can involve excluding the one or more objects determined at block 606 from being on the list.

At block 610, a request to render the first frame can be received. For example, the request can be received from a user (e.g., a director) via a rendering application. As illustration, the user can initiate rendering the 3D scene using the rendering application, which then generates the request. At block 612, the first list stored at block 608 can be retrieved. For example, in response to the request being received at block 610, a determination that the first list is to be used to render the first frame can be made; and in response this determination, the first list can be retrieved for rendering the first frame.

At block 614, a subsequent ray path tracing can be performed based on the first list retrieved at block 610. In some examples, block 614 can involve determine one or more objects on the first list to be exclude in the rendering process to render the first frame. In some examples, block 614 can involve performing blocks 406, 408, 410, 412, 414, 416, 418 for each of the objects on the first list. At block 616, the first frame can be rendered through the rendering process based on the subsequent path ray tracing at block 614.

Figure 7:
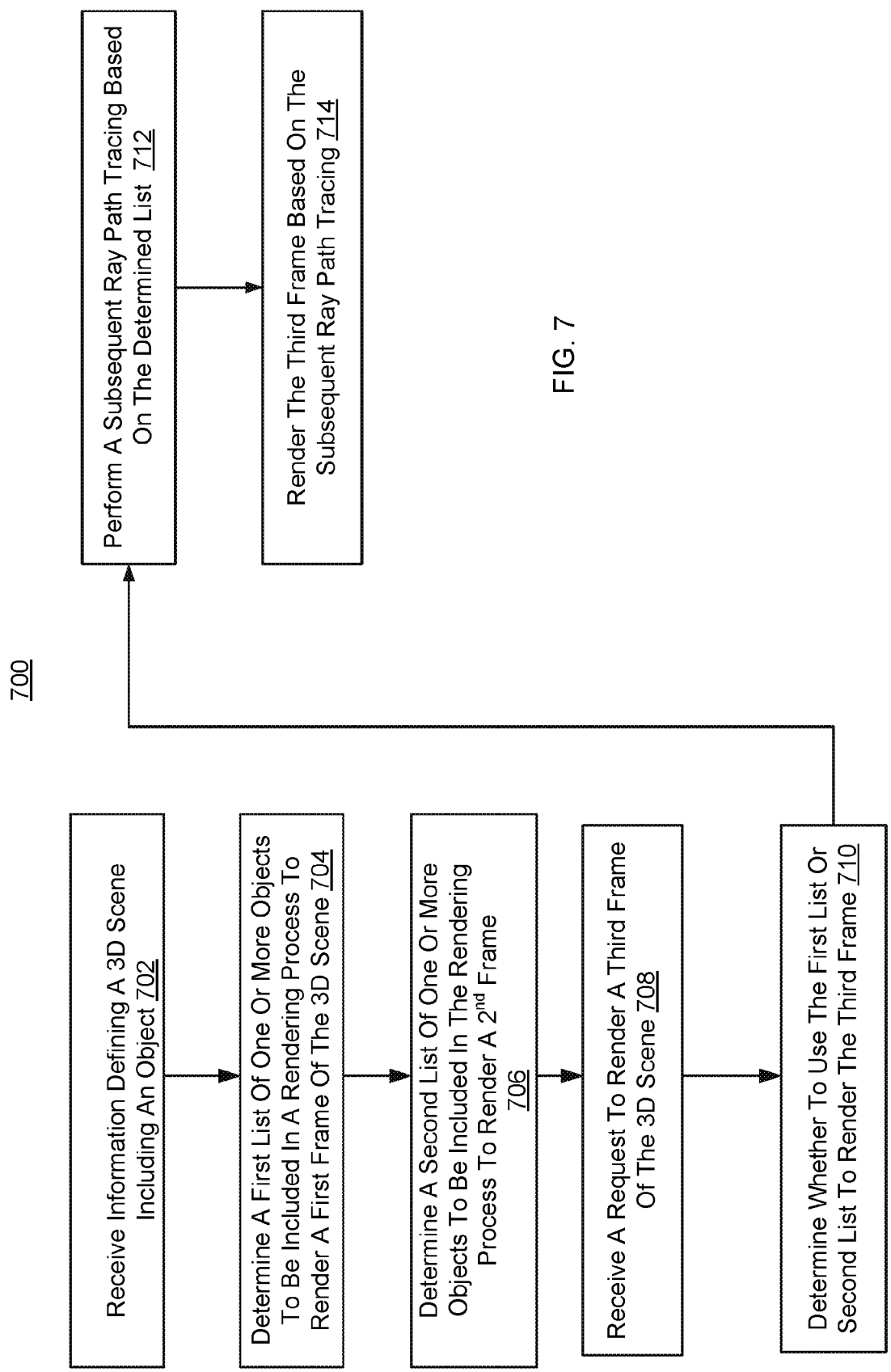
FIG. 7 is flowchart of an exemplary method for rendering a third frame of a 3D scene based on rendering of a first frame and a second frame of the 3D scene in accordance with one embodiment.

FIG. 7 is flowchart of an exemplary method 700 for rendering a third frame of a 3D scene based on a first frame and a second frame of the 3D scene in accordance with one embodiment. Method 700 may be used in rendering images of a segment of an animated scene such that one or more off-camera objects can be excluded in the rendering process. Method 700 may be performed wholly or partially by a computer system. It will be described with reference to FIGS. 4-6.

At block 702, information defining a 3D scene may be received for rendering the 3D scene. In some examples, block 702 can be the same as or substantially similar to block 602.

At block 704, a first list of one or more objects in the 3D scene can be determined to be included in a rendering process of a first frame of the 3D scene. In some embodiments, block 704 can involve performing blocks 514,516, 518, 520, 522, and 524 for rendering the second frame.

At block 706, a second list of one or more objects in the 3D scene can be determined to be included in the rendering process of a second frame of the 3D scene. In some embodiments, block 704 can involve performing blocks 514,516, 518, 520, 522, and 524 for rendering the second frame.

At block 708, a request to render a third frame in the 3D scene can be received. In some examples, the first, second and third frames can be consecutive frames of the 3D scene. However, it should be understood this is not necessarily the only case. In some examples, the first, second and third frames can be in a same set of frames of the 3D scene, for example a set of frames taken from a specific camera location in the 3D scene. In some examples, the first, second and third frames can be in different sets of frames of the 3D scene. For example, the first frame can be in a first set of frames taken from a first camera location in the 3D scene, and the second and third frames can be in a set of frames taken from a second camera location in the 3D scene. As another example, the first, second, and third frames can be in three different sets of frames of the 3D scene. Still as another example, the first and third frames can be in the same set of frames and the second frame can be in a different set of frames.

At block 710, a determination whether to use the first list for the first frame or the second list for the second frame can be determined. Determination at block 710 can be based on a number of factors. For example, the determination can be based on whether a view of the 3D scene depicting in the third frame is similar to the view in the first frame or in the second frame. As another example, the determination can be based on whether the third frame is in the same set of frames as the first or second frames. As illustration, for instance, the first frame may be a beginning frame in a first set of frames for a view of the 3D scene (e.g., a panning view of the 3D scene), and the third frame can be the last frame for in the first set; and the second frame can be a beginning frame for the next set of frames for the 3D scene (e.g., a close-up view of an object in the 3D scene immediately after the panning view depicted by the first set of frames). In that instance, the first list may be determined to be used for rendering the third frame. Still as another example, the determination at block 710 can be based on proximity between the third frame to the first frame and to the second frame. As illustration, the first frame can be a $5^{th}$ frame in a frame set, the third frame can be a $8^{th}$ frame in that set, and the second frame can be a $10^{th}$ frame in the set. In that instance, the second list may be determined to be used based on the third frame is closer to the second frame than to the first frame in the set.

At block 712, a subsequent ray path tracing can be performed based on the list determined at block 710. In some examples, block 712 can involve performing blocks 514,516, 518, 520, 522, and 524 for rendering the third frame using the list of one or more objects determined at block 710; and determining a third list of one or more objects to be included in the rendering process to render the third frame.

At block 714, third frame can be rendered based on the subsequent ray path tracing at block 712. In some examples, block 714 can involve rendering the third frame using a third list of one or more objects determined to be included in the rendering processing to render the third frame based on the subsequent ray path tracing at block 712.

IV. System

Figure 8:
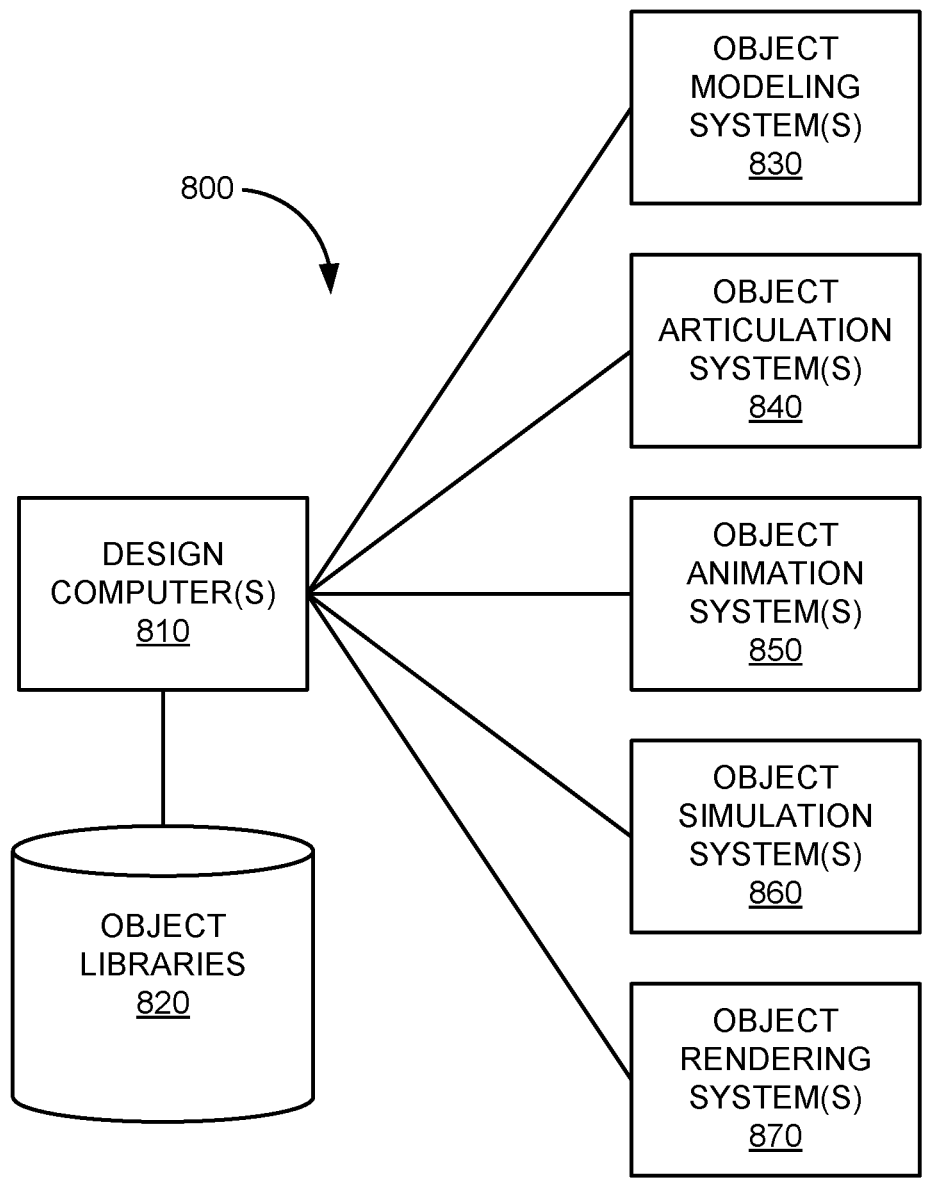
FIG. 8 generally illustrates an exemplary system that can be used to implement various embodiments.

FIG. 8 is a simplified block diagram of system 800 for creating computer graphics imagery (CGI) and computer-aided animation that may implement or incorporate various embodiments. In this example, system 800 can include one or more design computers 810, object library 820, one or more object modeler systems 830, one or more object articulation systems 840, one or more object animation systems 850, one or more object simulation systems 860, and one or more object rendering systems 870. Any of the systems 830-870 may be invoked by or used directly by a user of the one or more design computers 810 and/or automatically invoked by or used by one or more processes associated with the one or more design computers 810. Any of the elements of system 800 can include hardware and/or software elements configured for specific functions.

The one or more design computers 810 can include hardware and software elements configured for designing CGI and assisting with computer-aided animation. Each of the one or more design computers 810 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 810 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 810 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 810 acting as an animator may employ one or more systems or tools to specify motion and position of one or more objects over time to produce an animation.

Object library 820 can include elements configured for storing and accessing information related to objects used by the one or more design computers 810 during the various stages of a production process to produce CGI and animation. Some examples of object library 820 can include a file, a database, or other storage devices and mechanisms. Object library 820 may be locally accessible to the one or more design computers 810 or hosted by one or more external computer systems.

Some examples of information stored in object library 820 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 830 can include hardware and/or software elements configured for modeling one or more objects. Modeling can include the creating, sculpting, and editing of an object. In various embodiments, the one or more object modeling systems 830 may be configured to generated a model to include a description of the shape of an object. The one or more object modeling systems 830 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 830 may further generate model data (e.g., 2D and 3D model data) for use by other elements of system 800 or that can be stored in object library 820. The one or more object modeling systems 830 may be configured to allow a user to associate additional information, metadata, color, lighting, rigging, controls, or the like, with all or a portion of the generated model data.

The one or more object articulation systems 840 can include hardware and/or software elements configured to articulating one or more computer-generated objects. Articulation can include the building or creation of rigs, the rigging of an object, and the editing of rigging. In various embodiments, the one or more articulation systems 840 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 840 may further generate articulation data (e.g., data associated with controls or animations variables) for use by other elements of system 800 or that can be stored in object library 820. The one or more object articulation systems 840 may be configured to allow a user to associate additional information, metadata, color, lighting, rigging, controls, or the like, with all or a portion of the generated articulation data.

The one or more object animation systems 850 can include hardware and/or software elements configured for animating one or more computer-generated objects. Animation can include the specification of motion and position of an object over time. The one or more object animation systems 850 may be invoked by or used directly by a user of the one or more design computers 810 and/or automatically invoked by or used by one or more processes associated with the one or more design computers 810.

In various embodiments, the one or more animation systems 850 may be configured to enable users to manipulate controls or animation variables or utilized character rigging to specify one or more key frames of animation sequence. The one or more animation systems 850 generate intermediary frames based on the one or more key frames. In some embodiments, the one or more animation systems 850 may be configured to enable users to specify animation cues, paths, or the like according to one or more predefined sequences. The one or more animation systems 850 generate frames of the animation based on the animation cues or paths. In further embodiments, the one or more animation systems 850 may be configured to enable users to define animations using one or more animation languages, morphs, deformations, or the like.

The one or more object animations systems 850 may further generate animation data (e.g., inputs associated with controls or animations variables) for use by other elements of system 800 or that can be stored in object library 820. The one or more object animations systems 850 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 860 may be invoked by or used directly by a user of the one or more design computers 810 and/or automatically invoked by or used by one or more processes associated with the one or more design computers 810.

In various embodiments, the one or more object simulation systems 860 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 860 may be used to simulate the behavior of objects, such as hair, fur, and cloth, in response to a physics model and/or animation of one or more characters and objects within a computer-generated scene.

The one or more object simulation systems 860 may further generate simulation data (e.g., motion and position of an object over time) for use by other elements of system 100 or that can be stored in object library 820. The generated simulation data may be combined with or used in addition to animation data generated by the one or more object animation systems 150. The one or more object simulation systems 860 may be configured to allow a user to associate additional information, metadata, color, lighting, rigging, controls, or the like, with all or a portion of the generated simulation data.

The one or more object rendering systems 870 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 870 may be invoked by or used directly by a user of the one or more design computers 810 and/or automatically invoked by or used by one or more processes associated with the one or more design computers 810. One example of a software program embodied as the one or more object rendering systems 870 can include PhotoRealistic RenderMan, or PRMan, produced by Pixar Animations Studios of Emeryville, Calif.

In various embodiments, the one or more object rendering systems 870 can be configured to render one or more objects to produce one or more computer-generated images or a set of images over time that provide an animation. The one or more object rendering systems 870 may generate digital images or raster graphics images.

In various embodiments, a rendered image can be understood in terms of a number of visible features. Some examples of visible features that may be considered by the one or more object rendering systems 870 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 870 may further render images (e.g., motion and position of an object over time) for use by other elements of system 800 or that can be stored in object library 820. The one or more object rendering systems 870 may be configured to allow a user to associate additional information or metadata with all or a portion of the rendered image.

Figure 9:
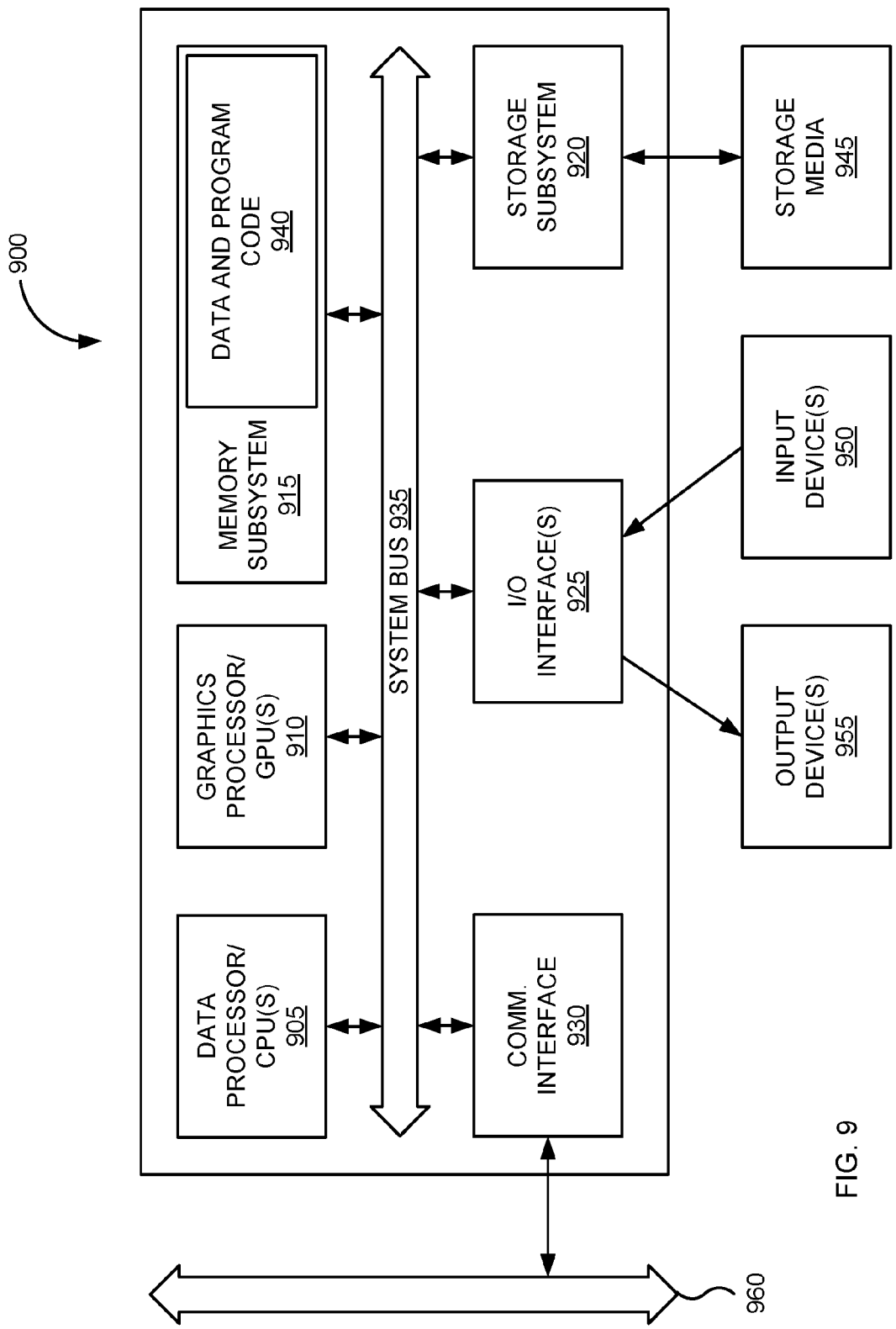
FIG. 9 generally illustrates an exemplary computer that can be used to implement various embodiments.

FIG. 9 is a block diagram of computer system 900. FIG. 9 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 900 and any of its components or subsystems can include hardware and/or software elements configured for performing methods described herein.

Computer system 900 may include familiar computer components, such as one or more one or more data processors or central processing units (CPUs) 905, one or more graphics processors or graphical processing units (GPUs) 910, memory subsystem 915, storage subsystem 920, one or more input/output (I/O) interfaces 925, communications interface 930, or the like. Computer system 900 can include system bus 935 interconnecting the above components and providing functionality, such connectivity and inter-device communication.

The one or more data processors or central processing units (CPUs) 905 can execute logic or program code or for providing application-specific functionality. Some examples of CPU(s) 905 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 910 can execute logic or program code associated with graphics or for providing graphics-specific functionality. GPUs 910 may include any conventional graphics processing unit, such as those provided by conventional video cards. In various embodiments, GPUs 910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 910 may include any number of registers, logic units, arithmetic units, caches, memory interfaces, or the like.

Memory subsystem 915 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 915 can include data and program code 940.

Storage subsystem 920 can also store information using machine-readable articles, information storage devices, or computer-readable storage media. Storage subsystem 920 may store information using storage media 945. Some examples of storage media 945 used by storage subsystem 920 can include floppy disks, hard disks, optical storage media such as CD-ROMS, DVDs and bar codes, removable storage devices, networked storage devices, or the like. In some embodiments, all or part of data and program code 940 may be stored using storage subsystem 920.

The one or more input/output (I/O) interfaces 925 can perform I/O operations. One or more input devices 950 and/or one or more output devices 955 may be communicatively coupled to the one or more I/O interfaces 925. The one or more input devices 950 can receive information from one or more sources for computer system 900. Some examples of the one or more input devices 950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 950 may allow a user of computer system 900 to interact with one or more non-graphical or graphical user interfaces to enter a comment, select objects, icons, text, user interface widgets, or other user interface elements that appear on a monitor/display device via a command, a click of a button, or the like.

The one or more output devices 955 can output information to one or more destinations for computer system 900. Some examples of the one or more output devices 955 can include a printer, a fax, a feedback device for a mouse or joystick, external storage systems, a monitor or other display device, a communications interface appropriately configured as a transceiver, or the like. The one or more output devices 955 may allow a user of computer system 900 to view objects, icons, text, user interface widgets, or other user interface elements. A display device or monitor may be used with computer system 900 and can include hardware and/or software elements configured for displaying information.

Communications interface 930 can perform communications operations, including sending and receiving data. Some examples of communications interface 930 may include a network communications interface (e.g. Ethernet, Wi-Fi, etc.). For example, communications interface 930 may be coupled to communications network/external bus 960, such as a computer network, a USB hub, or the like. A computer system can include a plurality of the same components or subsystems, e.g., connected together by communications interface 930 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 900 may also include one or more applications (e.g., software components or functions) to be executed by a processor to execute, perform, or otherwise implement techniques disclosed herein. These applications may be embodied as data and program code 940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 915 and/or storage subsystem 920.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for rendering a three-dimensional (3D) scene, the method being performed by a computer system and comprising:
   receiving computer graphics data defining a 3D scene, the 3D scene including one or more objects;
   providing a virtual camera at a particular position for capturing a first frame in the 3D scene;
   performing an initial ray path tracing to identify intersections between a plurality of rays from the virtual camera and each of the one or more objects in the 3D scene, wherein the initial ray path tracing is performed using a plurality of pixels of the virtual camera and one or more light sources; and
   based on the initial ray path tracing, performing an object analysis for the first frame of the 3D scene, the object analysis comprises:
      determining whether a first object is visible from the virtual camera at the particular position; and
      in response to determining that the first object is not visible from the virtual camera at the particular position:
         counting a first number of indirect ray path intersections between the plurality of rays and the first object;
         comparing the first number with a first threshold; and
         based on the first number being less than the first threshold:
            determining that the first object is to be excluded from a future rendering process using the computer graphics data defining the 3D scene; and
            identifying the first object as being excluded from the future rendering process.

2. The computer-implemented method of claim 1, wherein the first number of indirect ray path intersections indicates a corresponding number of rays from the one or more light sources that are deflected by the first object onto a second object visible from the virtual camera.

3. The computer-implemented method of claim 2, wherein the first number of indirect ray path intersections indicates a corresponding number of rays from the one or more light sources that are deflected by the first object onto a specular surface of the second object, the specular surface being visible from the virtual camera.

4. The computer-implemented method of claim 1, wherein when the first object is determined to be not visible from the camera, the object analysis further comprises:
   identifying whether the first object is opaque;
   wherein the first number is counted when the first object is identified as being opaque, and the first number of indirect ray path intersections indicates that the one or more light sources cast a shadow of the first object onto a second object visible from the virtual camera.

5. The computer-implemented method of claim 4, wherein the object analysis further comprises:
   identifying a second number of indirect ray path intersections between the plurality of rays and the first object, wherein the second number of indirect ray path intersections indicates a corresponding number of rays from the one or more light sources that are deflected by the first object onto a specular surface of the second object, the specular surface being visible from the virtual camera; and
   comparing the second number with a second threshold;
   wherein determining that the first object is to be excluded from the future rendering process and identifying the first object as being excluded from the future rendering process is further based on the second number being less than the second threshold.

6. The computer-implemented method of claim 1, wherein the first number of indirect ray path intersections indicates a corresponding number of rays from the one or more light sources that are refracted by the first object onto a second object visible from the virtual camera.

7. The computer-implemented method of claim 1, the object analysis further comprising:
   determining whether a second object is visible from the virtual camera at the particular position; and
   in response to determining that the second object is not visible from the virtual camera at the particular position:
      counting a second number of indirect ray path intersections between the plurality of rays and the second object;
      comparing the second number with the first threshold; and
      based on the second number exceeding the first threshold:

determining that the second object is to be included in the future rendering process using the computer graphics data defining the 3D scene; and identifying the second object as being included in the future rendering process.

8. The computer-implemented method of claim 7, wherein the object analysis further comprises:

generating and storing a first list of at least one object to be included in the future rendering process based on the first object being identified as being excluded from the future rendering process;

receiving a request to render the first frame of the 3D scene;

in response to the request, retrieving the first list;

performing a subsequent ray path tracing using the at least one object on the first list; and rendering the first frame based on the subsequent ray path tracing performed.

9. The computer-implemented method of claim 1, further comprising:

providing a second virtual camera at a second position for capturing a second frame in the 3D scene;

performing a second initial ray path tracing to identify intersections between a second plurality of rays from the second virtual camera and each of the one or more objects in the 3D scene;

performing a second object analysis for the second frame;

generating and storing a first list of one or more objects to be included in the future rendering process to render the first frame based on the object analysis for the first frame;

generating and storing a second list of one or more objects to be included in the future rendering process to render the second frame based on the second object analysis for the second frame;

receiving a request to render a third frame;

determining whether to use the first list or the second list in rendering the third frame;

performing a subsequent ray path tracing using the one or more objects on the determined list for rendering the third frame; and rendering the third frame based on the subsequent ray path tracing.

10. The computer-implemented method of claim 9, wherein determining whether to use the first list or the second list in rendering the third frame further comprises:

determining whether the third frame is in a same set of frames as the first frame or the second frame;

when the third frame is determined to be in the same set of frames as the first frame, the first list is determined to be used for rendering the third frame; and when the third frame is determined to be in the same set of frames as the second frame, the second list is determined to be used for rendering the third frame.

11. The computer-implemented method of claim 1, wherein identifying the first object as being not visible from the virtual camera at the particular position comprises:

counting a second number of intersections between the plurality of rays and the first object, the second number of intersections indicating a corresponding number of direct ray paths between the first object and the virtual camera; and based on the second number of intersections being less than a second threshold:

identifying the first object as being not visible from the virtual camera.

12. A system for rendering a three-dimensional (3D) scene, the system comprising one or more processors configured to:

receive computer graphics data defining a 3D scene, the 3D scene including one or more objects;

provide a virtual camera at a particular position for capturing a first frame in the 3D scene;

perform an initial ray path tracing to identify intersections between a plurality of rays from the virtual camera and each of the one or more objects in the 3D scene, wherein the initial ray path tracing is performed using a plurality of pixels of the virtual camera and one or more light sources; and based on the initial ray path tracing, perform an object analysis for the first frame of the 3D scene, the object analysis comprises:

determining whether a first object is visible from the virtual camera at the particular position; and in response to determining that the first object is not visible from the virtual camera at the particular position:

counting a first number of indirect ray path intersections between the plurality of rays and the first object;

comparing the first number with a first threshold; and based on the first number being less than the first threshold:

determining that the first object is to be excluded from a future rendering process using the computer graphics data defining the 3D scene; and identifying the first object as being excluded from the future rendering process.

13. The system of claim 12, wherein the first number of indirect ray path intersections indicates a corresponding number of rays from the one or more light sources that are deflected by the first object onto a second object visible from the virtual camera.

14. The system of claim 13, wherein the first number of indirect ray path intersections indicate a corresponding number of rays from the one or more light sources that are deflected by the first object onto a specular surface of the second object, the specular surface being visible from the virtual camera.

15. The system of claim 12, wherein when the first object is determined to be not visible from the camera, the object analysis further comprises:

identifying whether the first object is opaque;

wherein the first number is counted when the first object is identified as being opaque, and the first number of indirect ray path intersections indicates that the one or more light sources cast a shadow of the first object onto a second object visible from the virtual camera.

16. The system of claim 15, wherein the object analysis further comprises:

identifying a second number of indirect ray path intersections between the plurality of rays and the object, wherein the second number of indirect ray path intersections indicates a corresponding number of rays from the one or more light sources that are deflected by the first object onto a specular surface of the second object, the specular surface being visible from the virtual camera; and comparing the second number with a second threshold;

wherein determining that the first object is to be excluded from the future rendering process and identifying the first object as being excluded from the future rendering process is further based on the second number being less than the second threshold.

17. The system of claim 12,
wherein the first number of indirect ray path intersections indicates a corresponding number of rays from the one or more light sources that are refracted by the first object onto a second object visible from the virtual camera.

18. The system of claim 12, wherein the object analysis further comprises:
determining whether a second object is visible from the virtual camera at the particular position; and
in response to determining that the second object is not visible from the virtual camera at the particular position:
counting a second number of indirect ray path intersections between the plurality of rays and the second object;
comparing the second number with the first threshold; and
based on the second number exceeding the first threshold:
determining that the second object is to be included in the future rendering process using the computer graphics data defining the 3D scene; and
identifying the second object as being included in the future rendering process.

19. The system of claim 18, wherein the one or more processors are further configured to:
generate and store a first list of at least one object to be included in the future rendering process based on the first object being identified as being excluded from the future rendering process;
receive a request to render a first frame of the 3D scene;
in response to the request, retrieve the first list;
perform a subsequent ray path tracing using the one or more objects on the first list; and
render the first frame based on the subsequent ray path tracing performed.

20. The system of claim 12, wherein the one or more processors are further configured to:
provide a second virtual camera at a second position for capturing a second frame in the 3D scene;
perform a second initial ray path tracing to identify indirect ray path intersections between a plurality of rays from the second virtual camera and each of the one or more objects in the 3D scene;
perform a second object analysis for the second frame;
generate and store a first list of one or more objects to be included in the future rendering process to render the first frame based on the object analysis for the first frame;
generate and store a second list of one or more objects to be included in the future rendering process to render the second frame based on the second object analysis for the second frame;
receive a request to render the third frame;
determine whether to use the first list or the second list in rendering the third frame;
perform a subsequent ray path tracing using the one or more objects on the determined list for rendering the third frame; and
render the third frame based on the subsequent ray path tracing.

21. The system of claim 20, wherein determining whether to use the first list or the second list in rendering the third frame further comprises:
determining whether the third frame is in a same set of frames as the first frame or the second frame;
when the third frame is determined to be in the same set of frames as the first frame, the first list is determined to be used for rendering the third frame; and
when the third frame is determined to be in the same set of frames as the second frame, the second list is determined to be used for rendering the third frame.

22. The system of claim 12, wherein identifying the first object as being not visible from the virtual camera at the particular position comprises:
counting a second number of intersections between the plurality of rays and the first object, the second number of intersections indicating a corresponding number of direct ray paths between the first object and the virtual camera; and
based on the second number of intersections being less than a second threshold:
identifying the first object as being not visible from the virtual camera.

* * * * *